Figure 1:
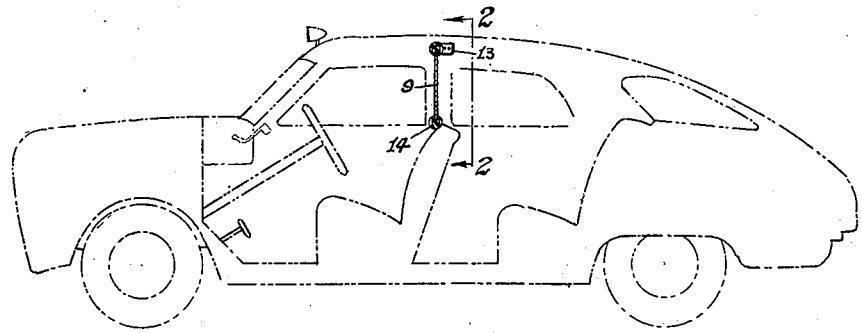

July 10, 1951  J. W. HELD  2,560,106
SAFETY PARTITION

Filed Aug. 9, 1948  2 Sheets-Sheet 1

INVENTOR.
John W. Held
BY
Hawgood & Van Horn
his ATTORNEYS.

July 10, 1951  J. W. HELD  2,560,106
SAFETY PARTITION

Filed Aug. 9, 1948  2 Sheets-Sheet 2

INVENTOR.
BY John W. Held
Hansgord & Van Hove
his ATTORNEYS.

Patented July 10, 1951

2,560,106

UNITED STATES PATENT OFFICE 2,560,106

SAFETY PARTITION

John W. Held, Fairview, Ohio, assignor to Tube Craft, Inc., Cleveland, Ohio, a corporation of Ohio Application August 9, 1948, Serial No. 43,196

1 Claim. (Cl. 296—85)

This invention relates to safety partitions and more particularly to devices of this type which are adapted for use in taxicabs and other public vehicles as a protection to the driver from back seat attack.

It is one of the objects of this invention to construct a safety partition which may easily be fitted to the cab body and rigidly held in place in a substantially vertical plane and occupying a major portion of the space between the top of the cab front seat and the roof of the cab.

A further object of the invention is a safety panel or partition comprising a sturdy frame enclosing a transparent flexible pane and having means whereby the partition may readily be rigidly secured to the cab body.

Another object consists in a safety panel or partition of the class described which is simple of construction and may be manufactured at low cost.

A further object of the invention is to provide a vehicle safety partition or panel separating the cab compartment from the passenger compartment, yet permitting proper circulation of air between the same, and further permitting freedom of conversation between the compartments.

Other objects and advantages of my invention will become more apparent as the following description of an embodiment thereof progresses, reference being made to the accompanying drawings in which like reference characters are employed to designate like parts throughout the same.

Figure 2:
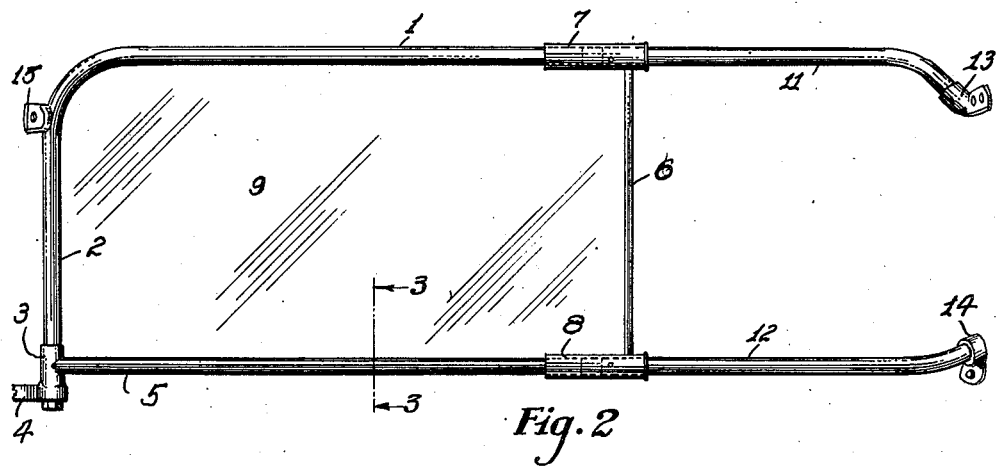
Figure 3:
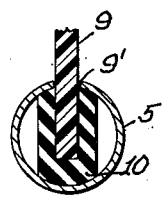
Figure 4:
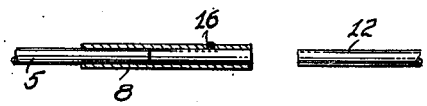
Figure 5:
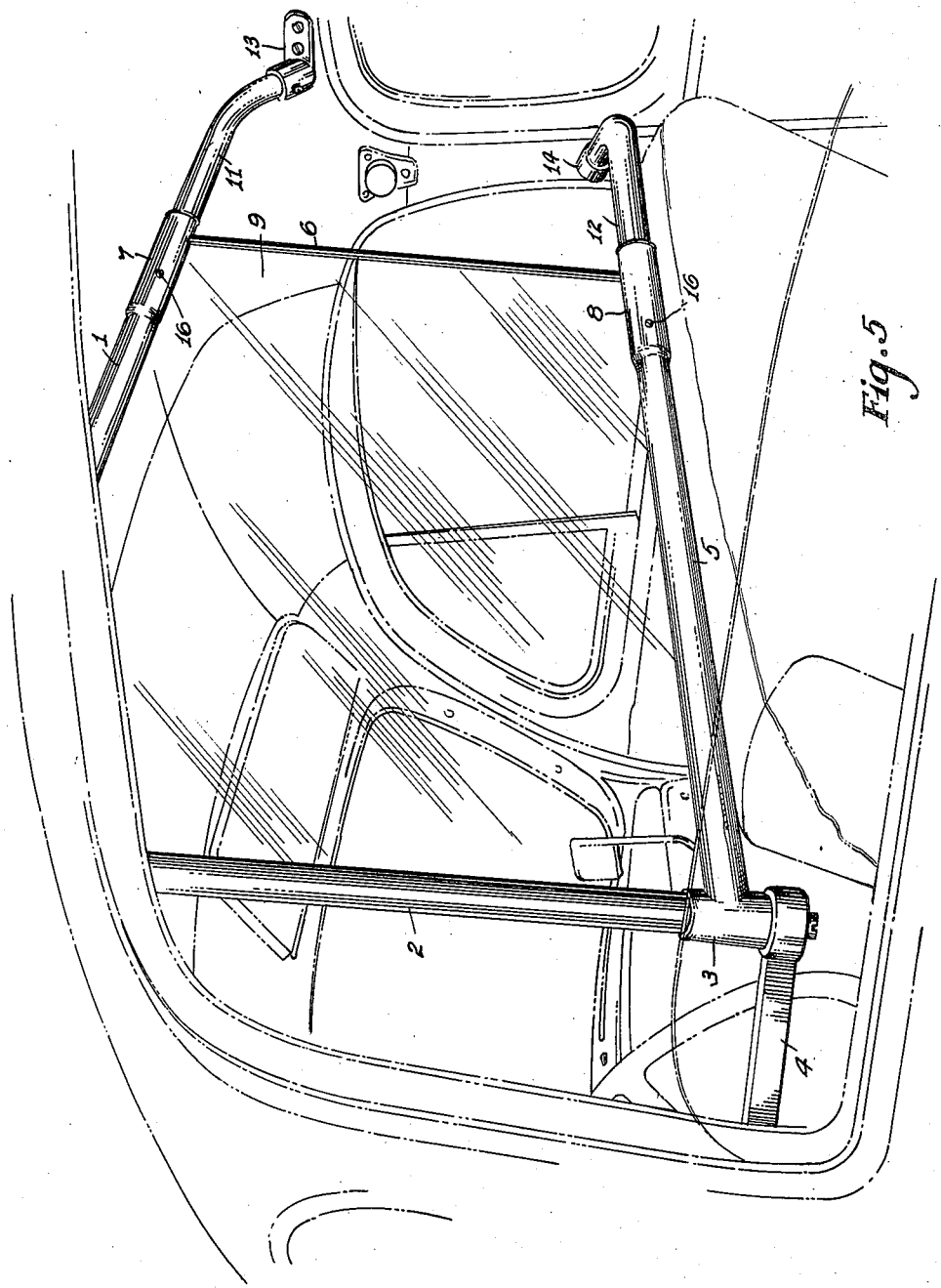

In the drawings,

Figure 1 is a vertical section through a safety panel embodying my invention, the same being shown applied in use, Figure 2 is a front elevation of the panel or partition as viewed from the rear seat of a taxicab or other vehicle, or in the direction of line 2—2 of Figure 1, Figure 3 is a vertical enlarged section taken on line 3—3 of Figure 2, Figure 4 is a distended view, partly in section, showing the telescoping sections of the panel frame, and Figure 5 is an enlarged perspective view of an embodiment of the invention shown in use in a taxicab.

In carrying out my invention as illustrated in the embodiment shown, there is provided a panel frame preferably of metal tubing comprising a continuous horizontal arm 1, a vertical arm 2 having its lower end rigidly secured in a socket 3 formed on the bracket 4, a second horizontal arm 5 having one end welded to the socket 3, and a second vertical frame member 6 rigidly secured at its ends to the sleeves or fittings 7 and 8 carried at inner ends of the arms 1 and 5. As shown in Figure 3, the tubing constituting the panel frame is provided with an opening $9^1$ throughout its extent and opening inwardly of the frame to receive the peripheral edges of a transparent, flexible pane 9. Those portions of the edges lying within the arms 1 and 5 of the tubing are seated in a resilient U-shaped gasket or channel 10 carried and concealed within the tubing. In this manner the panel assures a neat and finished appearance and the pane is securely held in place therein and rattling is eliminated.

Sleeves 7 and 8 are rigidly secured to the inner ends of the frame members 1 and 5 respectively and extend outwardly thereof to receive the adjacent ends of the supporting tubes 11 and 12 respectively. The tubes 11 and 12 are provided at their opposite ends with brackets or lugs 13 and 14 respectively by which means the device is rigidly secured to the cab body or frame on one side as indicated in Figure 5, while the bracket arm 4 and the lug 15 located at the top of the vertical member 2 may be rigidly secured to the opposite side of the cab body or frame.

The ends of the tubes 11 and 12 positioned in the sleeves 7 and 8 may be welded or otherwise secured thereto as at 16 when the proper adjustment has been made so that the securing brackets and lugs will all properly engage the cab body sides or frame members when the panel is secured in place, thus providing a sturdy and rigid support for the panel.

It will be noted that the pane 9 extends only to the vertical frame member 6 and, as shown in Figures 2 and 5, the space between the tubes 11 and 12 is void thus providing for the circulation of air between the driving and passenger compartments of the cab and for freedom of conversation between the driver and passengers, yet affording a positive means of protection to the driver from rear seat surprise attack.

While the embodiment shown illustrates the protective panel behind the driving position in left hand drive cabs, it will be understood that the same is equally well adapted to cabs or other vehicles having a right hand driving position, it being merely necessary to reverse the position of the panel so that the driver will be in the same relative position, that is, in front of the transparent, non-shattering pane 9.

From the foregoing it will be understood that by my invention I have provided a safety panel or partition for taxicabs or other commercial passenger carrying vehicles which not only affords protection against surprise attack from the rear seat but materially raises the driver morale.

Various changes may be made in the details of construction and arrangement of parts without departing from the spirit of the invention or the scope of the appended claim.

I claim:

The combination with a taxicab body having opposed side frame members, a driving compartment and a passenger compartment, of a safety partition separating said compartments and comprising a frame member bent intermediate its ends to provide a vertical end member adjacent one of its ends and a substantially horizontal arm extending from said end member, a second horizontal frame member spaced from said arm and rigidly connected at one end to said end member, and a protective pane secured in said frame and extending from said vertical end member toward the opposite ends of said horizontal members but terminating near and adjacent to said opposite ends to provide a space communicating the driving and passenger compartments when said partition is assembled in a taxicab and means carried by said partition frame members whereby to secure the same to said opposed side frame members of the taxicab body, whereby to secure said vertical end member closely adjacent to an adjacent side frame member.

JOHN W. HELD.

REFERENCES CITED

The following references are of record in the file of this patent:

UNITED STATES PATENTS

| Number | Name | Date |
| --- | --- | --- |
| 1,412,474 | Lillie | Apr. 11, 1922 |
| 1,605,212 | Bourgon | Nov. 2, 1926 |
| 2,263,698 | Hodgson | Nov. 25, 1941 |
| 2,385,557 | Ward | Sept. 25, 1945 |